United States Patent [19]

Hunter et al.

[11] Patent Number: 4,461,499

[45] Date of Patent: Jul. 24, 1984

[54] TRANSVERSE JOINT SYSTEM FOR SHEET METAL DUCTS

[75] Inventors: A. Reese Hunter; Robert H. Hudson, both of Greensboro, N.C.

[73] Assignee: Industrial Air, Inc., Greensboro, N.C.

[21] Appl. No.: 477,923

[22] Filed: Mar. 23, 1983

[51] Int. Cl.³ .............................................. F16L 23/00
[52] U.S. Cl. ..................................... 285/364; 285/424
[58] Field of Search ......................... 285/424, 406, 364

[56] References Cited

U.S. PATENT DOCUMENTS

| | | | |
|---|---|---|---|
| 2,627,430 | 2/1953 | Koffler | 285/424 X |
| 3,154,330 | 10/1964 | Clark et al. | 285/424 X |
| 3,428,342 | 2/1969 | Chambers | 285/424 X |
| 3,460,859 | 8/1969 | Keating | 285/424 X |
| 3,630,549 | 12/1971 | Grimm | 285/424 X |
| 3,791,681 | 2/1974 | Moldow | 285/424 X |

FOREIGN PATENT DOCUMENTS

| | | | |
|---|---|---|---|
| 36038 | 9/1981 | European Pat. Off. | 285/364 |
| 2414815 | 10/1975 | Fed. Rep. of Germany | 285/424 |
| 2435252 | 2/1976 | Fed. Rep. of Germany | 285/364 |
| 312030 | 6/1969 | Sweden | 285/364 |

*Primary Examiner*—Thomas F. Callaghan
*Attorney, Agent, or Firm*—Charles R. Rhodes; Judith G. Smith

[57] ABSTRACT

Abutting sections of sheet metal ducts are joined at an interface by flanging the ends of each section adjacent the interface and forming a plurality of spaced tabs in the wall surface of the flanges, which tabs protrude outwardly in a direction away from the interface. A generally V-shaped coupling member, having a portion of the free edges thereof folded back under the corresponding side wall, is then assembled over a pair of opposed flanges with the edges of the folded under portions snapping in behind the tabs to lock the flanges together.

4 Claims, 8 Drawing Figures

TRANSVERSE JOINT SYSTEM FOR SHEET METAL DUCTS

BACKGROUND AND SUMMARY OF THE INVENTION

This application pertains to the assembly of sheet metal duct work. More particularly, it pertains to a transverse joint technique for connecting abutting sections of sheet metal ducts.

Sheet metal ducts are generally designed to function in one of three situations. They may carry air in an external situation (e.g. rooftop) in which the duct work must be insulated. In such cases, at each transverse joint, it is necessary to seal the joint or else the positive air pressure within the duct work, escaping through the cracks at the joints will blow off the insulation surrounding the duct work and conditioned air may be lost. In order to seal the joints of such exterior duct work, it has become conventional to utilize a gasket material between the abutting edges or flanges of the duct sections, and then secure the connection with a relatively elaborate clamping system. Examples of such types of transverse joint connections are illustrated and described in U.S. Pat. Nos. 3,630,549 to Grimm and 3,791,681 to Moldow.

In a second environment for sheet metal duct work, the air carried through the duct work contains a product of some type therein, such as lint, waste, dust, grain, and the like. In such situations, it is preferable to have the joint relatively air tight so that the material being carried within the duct cannot escape. It is also highly preferable that the interior wall of the duct at the joint contain no protruding obstructions to the path of air and product flow therethrough. Otherwise, there will be encountered tagging, build up of product at the joint area, and/or turbulence within the duct work leading to loss of efficiency in air flow. One solution to this problem is the Lockformer system in which flanges are formed on the end of each duct section adjacent the joint, which flanges bend outwardly from the wall of the duct, then parallel to the duct in a direction away from the interface. A gasket is positioned between the abutting upstanding flanges. A separate connector surrounding the joint is bent around the shaped flanges to secure the joint. While this arrangement is satisfactory once it is accomplished, it is relatively heavy and too costly to use in the first situation described above. The cost is increased as a result of special equipment necessary to form the double flanges required, which equipment is not suitable for other uses. Further, the special corner connecting pieces are expensive.

In a third situation, sheet metal duct work is used to transport air in an interior situation such as within the walls of an industrial plant. In such environment, it is not necessary to obtain an absolute seal at each transverse joint because the duct is in the area to be air conditioned, and a small amount of leakage is not going to matter since the air is merely going to leak into the space to be conditioned. Therefore, here the emphasis is on ease of assembly and economy. A conventional joint for such types of installations is referred to as the pocket lock joint in which a clip is positioned on the raw edge of one of the duct sections, and then a special tool punches through the clip and the raw edge to form a fastener on one edge. The clip includes a portion that extends perpendicularly to the wall of the duct and then back longitudinally and receives an upstanding flange which is bent into the adjacent edge of the adjoining duct. Once the flange is inserted within the clip, the top portion is bent down over the flange to secure the second section to the first. While this is an effective, and relatively economical joint forming technique, it is only applicable to interior air conditioning ducts which are not to be insulated, which do not have to be sealed, and which are not carrying any product therein, because the punched portion of the clip and duct extends into the interior of the duct and would cause a severe tagging problem if a product were being carried through the duct.

In the present invention, the purpose is to provide one type of transverse joint system that can be used in all environments, and is also both relatively easy to assemble without special tools, and economical to produce. Toward this end, then, the joint of the present invention is effected, first of all, by each side wall of each of the duct sections being so preformed as to terminate in an integrally formed, outwardly extending flange. In each of such flanges, there is provided a plurality of laterally aligned, spaced tabs formed in the wall surface thereof. These tabs protrude outwardly from the surface of the flange in a direction away from the joint being formed. Finally, a generally V-shaped, snap-on coupling member clips onto each pair of opposed flanges and locks them together.

The V-shaped coupling member includes a pair of opposed walls connected along one edge, while a portion of the free edges of the walls are folded back between the walls to form a pair of retaining edges. As the coupling is snapped onto the flanges, the resilience in the folded metal member causes the walls to spring aside as the coupling member is pushed onto the flanges, then the retaining edges snap in behind the protruding tabs in the flanges to secure the coupling member thereon. It is apparent that the distance between the side wall of the duct and the point on the flange at which the tab is formed must be slightly greater than the width of the retaining edges.

The ends of the coupling members extend out laterally past the termination of the corresponding side wall. The ends of adjacent coupling members are then overlapped and secured in some suitable manner. In situations where sealing is required, a gasket is placed between the opposing flanges of the two duct sections prior to the installation of the coupling member.

It is, therefore, an object of the present invention to provide a sheet metal duct transverse joint system which is more economical to fabricate and may be assembled without special tools, yet may be utilized with exterior ducts, interior ducts, or ducts carrying product therein.

It is another object of the present invention to provide a sheet metal duct transverse joint of the type described in which the inside wall of the duct is smooth at the point of the connection, there being no protrusions or abutments extending within the duct work.

It is yet another object of the present invention to provide a transverse joint system of the type described which further includes a simple corner-connecting means for connecting the corners of the coupling members.

Other objects and a fuller understanding of the invention will become apparent from reading the following detailed description of a preferred embodiment along with the accompanying drawings in which.

Detailed Description of A Preferred Embodiment

Figure 1:
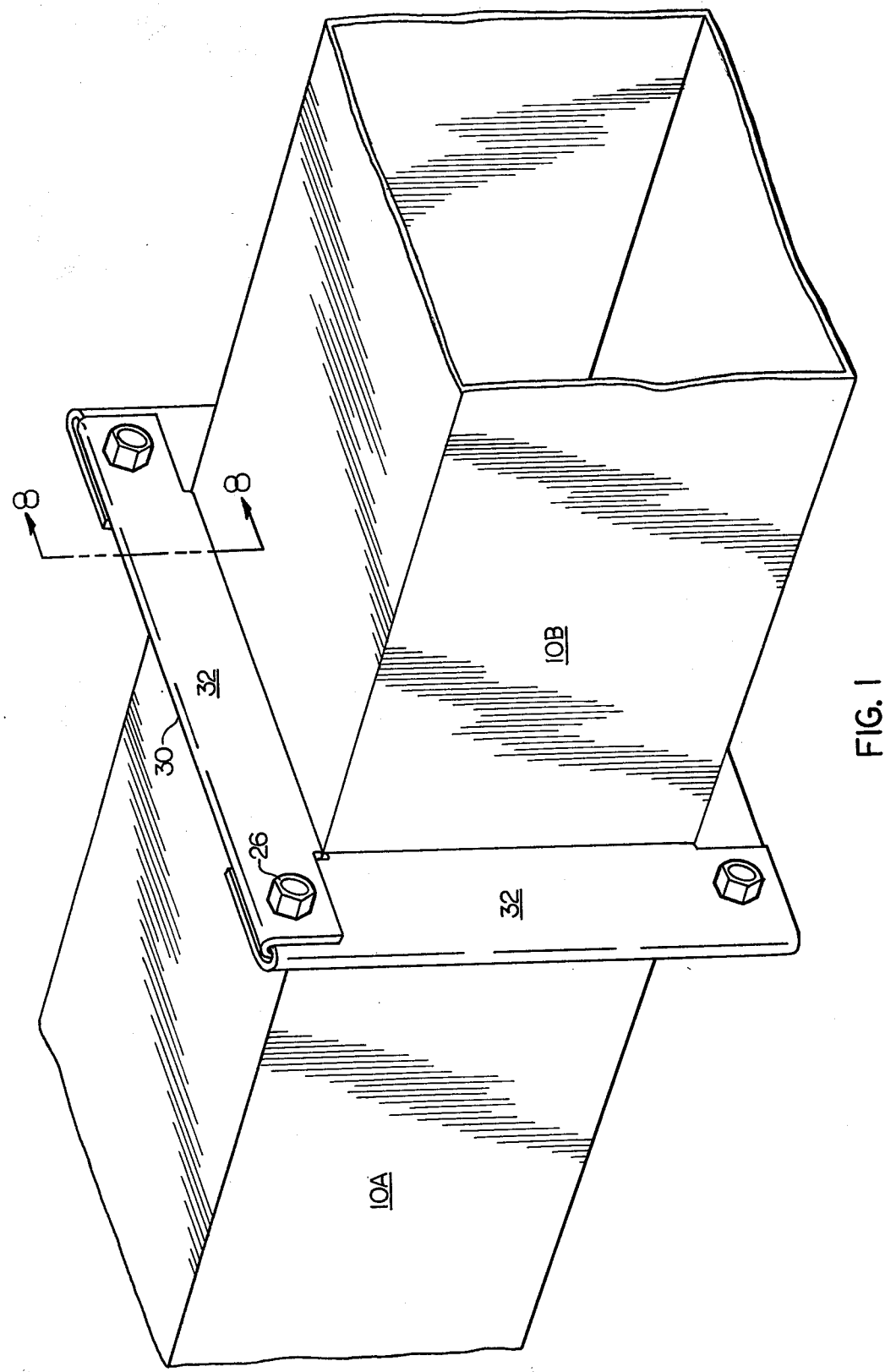
FIG. 1 is a perspective view illustrating the transverse joint system of the present invention joining two adjacent sections of a sheet metal duct.

Turning now to the drawings, and particularly to FIG. 1, there is illustrated the transverse joint system of the present invention used to connect a pair of abutting duct members 10A and 10B. Duct members 10A,10B are rectangular in cross-sectional shape; however, it can easily be seen that the present invention could be applied to any polygonal shape (i.e. triangular, five-sided, etc.). The first step in forming the transverse joint of the present invention is to form at the abutting ends of each wall of duct emmber 10A,10B a flange 12A, 12B, 14A, 14B, 16A, 16B, 18A, 18B which extends outwardly from the corresponding side wall adjacent the interface between the two duct sections.

Figure 2:
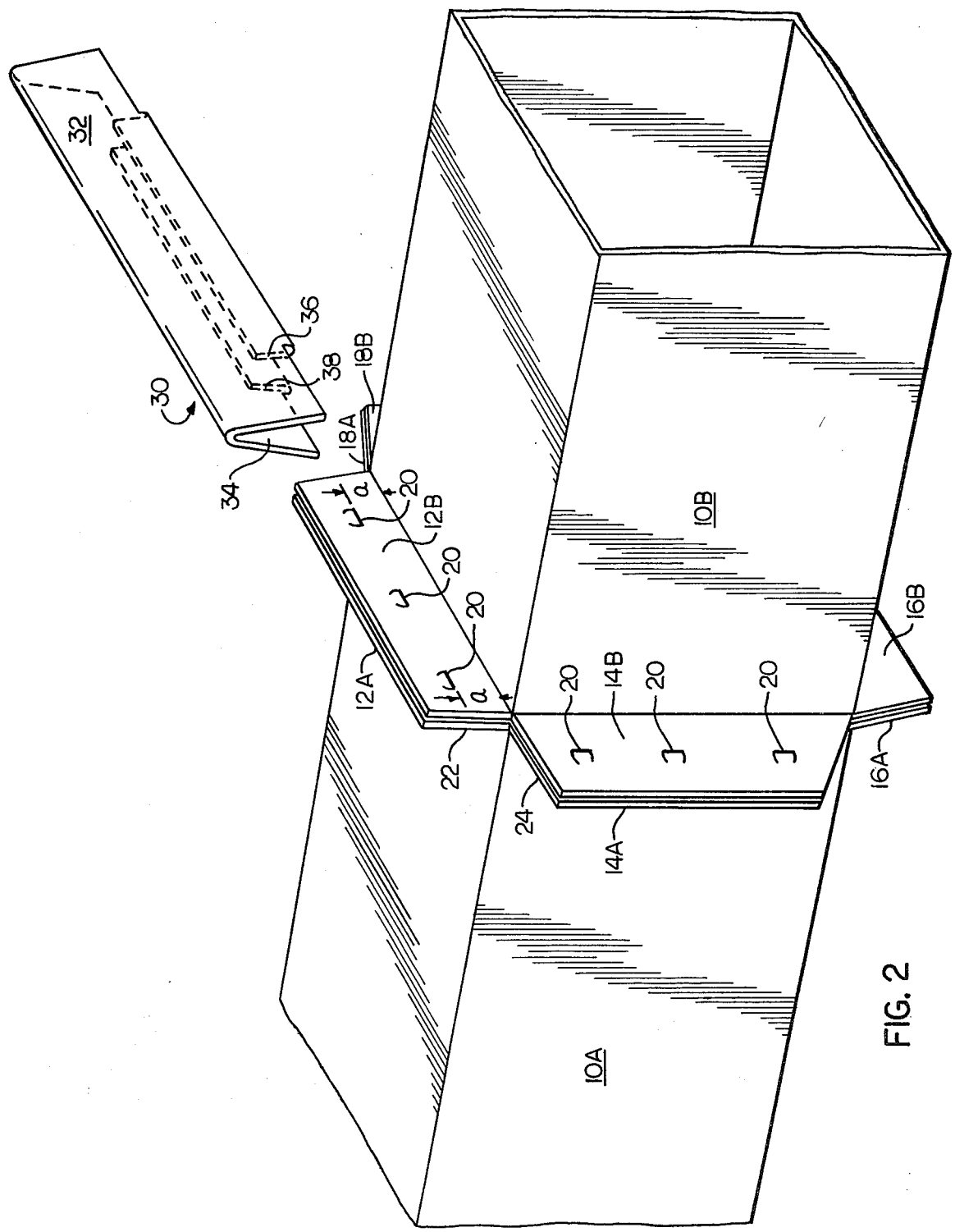
FIG. 2 is a perspective view similar to FIG. 1, except showing the coupling members removed therefrom.

As better shown in FIG. 2, each of the flanges 12, 14, 16, and 18 are provided with a plurality of locking tabs or protruberances 20 which can be pressed outwardly from the wall surface of the flanges according to conventional techniques. The primary considerations to keep in mind concerning locking tabs 20 is that they should all protrude outwardly from the surface of the flange which is opposite the interface, so that the coupling members 32 will lock onto the flanges. Secondly, the locking tabs 20 should all be aligned so that they are all the same distance from the adjacent wall surface of duct sections 10A, 10B. If they are not all aligned, then the coupling member 32 will only grip on some of tabs and there will not be a satisfactory coupling. The third point concerning the tabs 20 is that they should be so designed as to be struck from the surface of the corresponding flange at a distance "a" from adjacent wall of duct sections 10A, 10B (see FIG. 2). The reason for this distance will become apparent hereinafter. Although the flanges may be rectangular in shape, it is preferred that the edges 22, 24 be angled as illustrated in FIG. 2 to prevent excessive sharp edges for workmen to avoid and to facilitate assembly of the coupling member 32.

As illustrated now in FIGS. 1 and 2, a U- or V-shaped coupling member 30 is secured to the above-mentioned flanges. The coupling member 30 is longer than the corresponding side wall of the duct to which it is applied, so that a portion extends outwardly to interlock with the adjacent coupling member on the perpendicular side wall. The end portions of the two coupling members overlap, and a screw and bolt arrangement 26 may be used to secure the coupling members 32 together.

Figure 4:
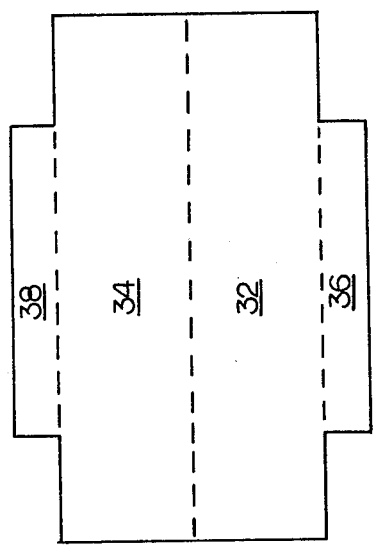
FIG. 4 is a plan view illustrating the metal blank, unfolded, which is used to form the coupling member of FIG. 3.
Figure 3:
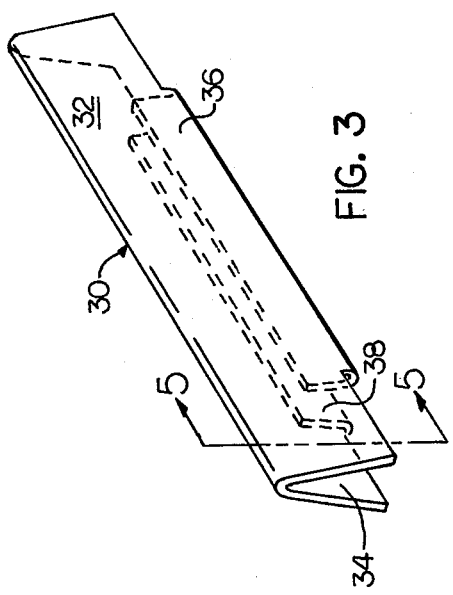
FIG. 3 is a perspective view illustrating one of the connecting members.
Figure 5:
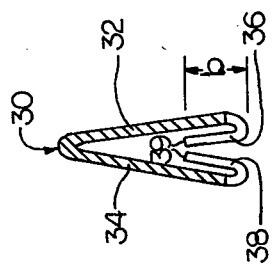
FIG. 5 is a cross-sectional view of the coupling member taken substantially along lines 5—5 in FIG. 3.

Turning now to FIGS. 3–5, there is illustrated in more detail the coupling member 30 which is formed of a U- or V-shaped sheet metal member having a pair of opposed side walls 32, 34 which are longer than the corresponding side walls of the duct to which they are to be applied as described hereinabove. The central longitudinal portion of each side wall 32, 34 includes an extended strip 36, 38 (FIG. 4). When formed into the final shape as illustrated in FIGS. 3 and 5, the extended strips 36,38 are bent back up behind side walls 32 and 34 to provide a pair of locking edges 39 thereunder. Looking now at FIG. 5, the width dimension "b" should be such that when the extended strips 36, 38 are bent beneath walls 32,34, the distance "b" is slightly less than or substantially equal to the dimension "a" shown in FIG. 2 for clearance purposes. Also, the coupling member 30 should be so formed that the distance between the two terminal edges 39 of strips 36,38 (in the relaxed condition) should be less than the distance between extremities of tabs 20 of adjacent flanges (e.g. flanges 12A,12B). Preferably this distance is even less than the distance between the outer surfaces of the flanges themselves, so as to squeeze the flanges together to form the seal as described hereafter. So arranged, the coupling member 30 exhibits some natural resilience as a result of the bending necessary to get it into the shape illustrated in FIG. 5. When the clip is either forced downwardly upon flanges or slid longitudinally therealong, the extended retaining edges 36,38 will spread to clear the protruding tabs 20. As the coupling member 30 is fully seated, the retaining edges 36,38 will then spring back in behind the tabs to effect the locking therebehind.

Figure 6:
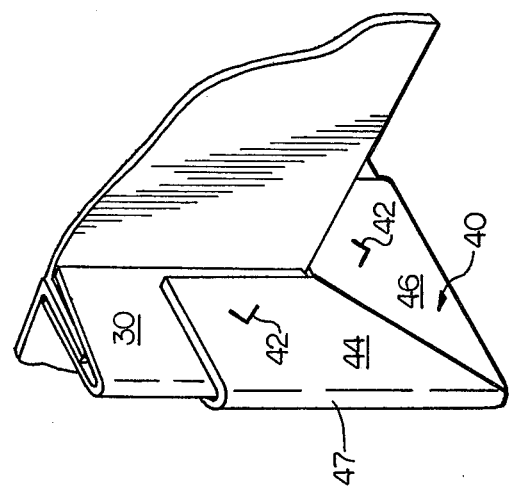
FIG. 6 is a perspective view illustrating one corner of a duct having an alternate corner securing member mounted thereon.
Figure 7:
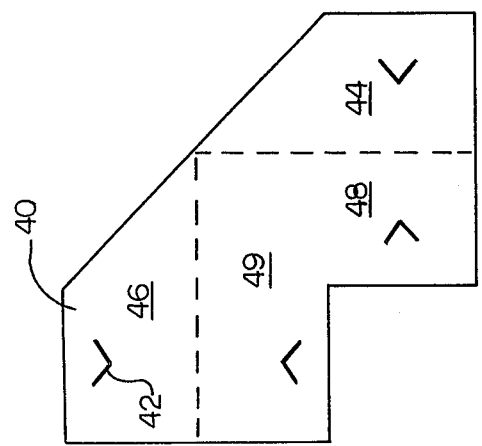
FIG. 7 is a plan view of the blank from which the corner securing member of FIG. 6 is formed.

In FIG. 1 there is illustrated one technique for securing the ends of the coupling members. An alternate technique is illustrated in FIGS. 6 and 7 and includes a separated L-shaped member 40 applied to each corner. Each leg of the cover member 40 includes a front wall 44, 46 and a rear wall 48,49 joined along the outer edge 47 and forming a groove therein which receives the overlapped end portions of said coupling member therebetween. The cover member 40 is formed from a blank as illustrated in FIG. 7 and includes a plurality of indentions or sharp projections 42 on the interior surface thereof. The projections 42 are pointed in such a direction that the cover 40 may be easily slid onto the corner assembly, however, the sharp points of projections 42 will bite into the metal on the underside of the cover if the cover is attempted to be removed. Therefore, the projections in FIG. 6 are protruding from the inner wall of the cover 40 adjacent the coupling member 30 thereunder. In FIG. 7, there is illustrated the blank of metal from which the cover member 40 is cut. The dotted line represents the fold line about which the two sides are folded to form the L-shaped cover member illustrated in FIG. 6.

Figure 8:
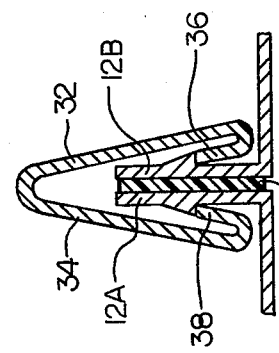
FIG. 8 is a sectional view taken substantially along lines 8—8 in FIG. 1.

It should also be understood, with reference to FIG. 8, that a gasket member 50 may be placed between two upstanding flanges 12A,12B, so that as the coupling 30 is locked into place the joint connector actually becomes sealed, thus preventing the passage of air through the joint.

While a preferred embodiment of the present invention has been described in detail hereinabove, it should be understood that various changes and modifications might be made without departing from the scope of the invention which is set forth in the accompanying claims.

What is claimed is:

1. A transverse joint system for connecting adjacent sections of sheet metal ducts having a polygonal cross-sectional shape, said joint system comprising:
   (a) each side wall of each of said duct sections terminating in an integrally formed, outwardly extending flange adjacent the interface between the two duct sections;
   (b) each of said flanges including a plurality of laterally aligned, spaced tabs formed in the face thereof protruding outwardly from the surface of said flange opposite said interface;
   (c) a coupling means for joining each pair of opposed flanges comprising a V- or U-shaped member having two opposed walls joined along one edge and having at least a strip portion of the free edges thereof folded back under the corresponding one of said walls to form retaining edges therebeneath;
   (d) the distance between the spaced tabs and the adjacent wall of said duct is substantially equal to the corresponding width dimension of the folded strip portion of said coupling member; such that when said coupling member is assembled on a pair of adjacent flanges, said folded strip portions lock behind said tabs to effect said transverse joint.

2. The transverse joint system according to claim 1 wherein the length of each of said coupling members is greater than the corresponding width of said duct wall, whereby the ends of each coupling member extend past the duct wall and overlap the ends of the adjacent coupling member; and further including means for connecting the overlapped end portions together.

3. The transverse joint system according to claim 2 wherein said means for connecting the overlapped end portions together comprises an L-shaped cover member, each leg of said cover member including a front and rear wall joined along the outer edge and forming a groove therein which receives the overlapped portion of said coupling members in gripping relation therebetween, each of said front and rear walls incuding at least one sharp projection therein on the interior surface thereof, whereby said cover member may be easily slid onto the overlapped end portions; however, said sharp points of said sharp projections will bite into the metal of said flanges if the cover is attempted to be removed.

4. The transverse joint system according to claim 1 and further including a gasket between the adjacent flanges of two abutting duct sections, whereby said joint is sealed.

* * * * *